(12) United States Patent
Hyeon et al.

(10) Patent No.: US 7,867,463 B2
(45) Date of Patent: Jan. 11, 2011

(54) PROCESS FOR PRODUCING CERIUM OXIDE NANOCRYSTALS

(76) Inventors: Taeg-Hwan Hyeon, 106 dong 303 ho, Samsung Kaemian Apt., Dogog-dong 91-5, Gangnam-gu, Seoul (KR) 135-537; Taekyung Yu, 15 dong 1903 ho, Woosung Apt., Sindaebangl-dong, Dongjak-gu, Seoul (KR) 156-786

( * ) Notice: Subject to any disclaimer, the term of this patent is extended or adjusted under 35 U.S.C. 154(b) by 0 days.

(21) Appl. No.: 11/543,987

(22) Filed: Oct. 6, 2006

(65) Prior Publication Data

US 2007/0092423 A1    Apr. 26, 2007

(30) Foreign Application Priority Data

Oct. 8, 2005  (KR) ............... 10-2005-0094626
Sep. 30, 2006  (KR) ............... 10-2006-0096792

(51) Int. Cl.
C01F 17/00 (2006.01)
B01J 23/10 (2006.01)
(52) U.S. Cl. .................. 423/263; 502/304; 977/773; 977/775; 977/776
(58) Field of Classification Search ............ 423/263; 502/258, 304; 977/773, 775, 776
See application file for complete search history.

(56) References Cited

U.S. PATENT DOCUMENTS

2006/0133990 A1 * 6/2006 Hyeon et al. ............ 423/622

FOREIGN PATENT DOCUMENTS

WO    2004/037722 A1    5/2004

OTHER PUBLICATIONS

Yu et al., "Large-Scale Nonhydrolytic Sol-Gel Synthesis of Uniform-Sized Ceria Nanocrystals with Spherical, Wire, and Tadpole Shapes," Angewandte Chemie International Edition 2005, 44, 7411-7414. Published online Oct. 25, 2005.*
Si et al., "Rare-Earth Oxide Nanopolyhedra, Nanoplates, and Nanodisks," Angewandte Chemie International Edition 2005, 44, 3256-3260. Published Online Apr. 21, 2005.*
Park et al., "Ultra-large-scale synthesis of monodisperse nanocrystals," Nature Materials, Dec. 3,2004, 891-895.*
Pavasupree et al. "Preparation and characterization of mesoporous MO2 (M=Ti, Ce, Zr, and Hf) nanopowders by a modified sol-gel method," Ceramics International 31 (2005) 959-963.*
Zhang et al. "Cerium oxide nanoparticles: Size-selective formation and structure analysis," Applied Physics Letters 80, 1, 127-129. Jan. 7, 2002.*
Vioux, A., "Nonhydrolytic Sol-Gel Routes to Oxides," *Chem. Mater. American Chemical Society*, vol. 9, No. 11, pp. 2292-2299, (1997).
Joo, J., et al., "Multigram Scale Synthesis and Characterization of Monodisperse Tetragonal Zirconia Nanocrystals," *J.Am.Chem.Soc.* vol. 125, No. 21, pp. 6553-6557, (2003).
Joo, J., et al.,"Generalized and Facile Synthesis of Semiconducting Metal Sulfide Nanocrystals," J.Am.Chem.Soc. vol. 125, No. 36, pp. 11100-11105, (2003).
Vioux, Nonhydrolytic Sol-Gel Routes to Oxides, Chem. Mater. 1997, 9, 2292-2299.
Park et al., Synthesis of Monodisperse Spherical Nanocrystals, Agnew. Chem. Int. Ed. 2007, 46, 4630-4660.

* cited by examiner

*Primary Examiner*—Stanley Silverman
*Assistant Examiner*—Anthony J Zimmer
(74) *Attorney, Agent, or Firm*—Roberts Mlotkowski Safran & Cole P.C.

(57) ABSTRACT

The present invention provides a new method for the production of cerium oxide ($CeO_2$) nanocrystals having various sizes and various shapes via hydrolytic sol-gel reactions or non-hydrolytic sol-gel reactions. More specifically, the method synthesizing cerium oxide nanocrystals comprises; i) preparing a cerium-surfactant complex by reacting a cerium precursor and a surfactant in a organic solvent; and ii) aging said cerium-surfactant complex in an ether at a temperature of 100° C.-360° C.

17 Claims, 15 Drawing Sheets is a schematic flow chart showing a synthetic procedure of cerium oxide nanocrystals via a non-hydrolytic sol-gel reaction according to the present invention.

Fig. 1 is an exemplary transmission electron microscopic (TEM) image of Tadpole-shaped nanowires consisted of 3.5 nm sized spherical head and wire-shaped tail with a diameter of 1.2 nm and length of 30 nm via a non-hydrolytic sol-gel reaction according to the present invention.

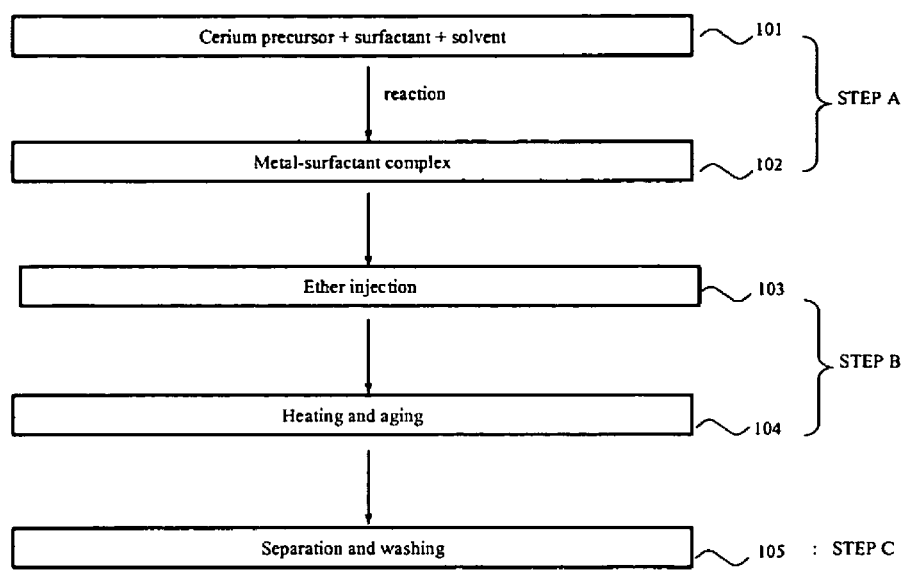
Fig. 2 is a schematic flow chart showing a synthetic procedure of cerium oxide nanocrystals via a non-hydrolytic sol-gel reaction according to the present invention.

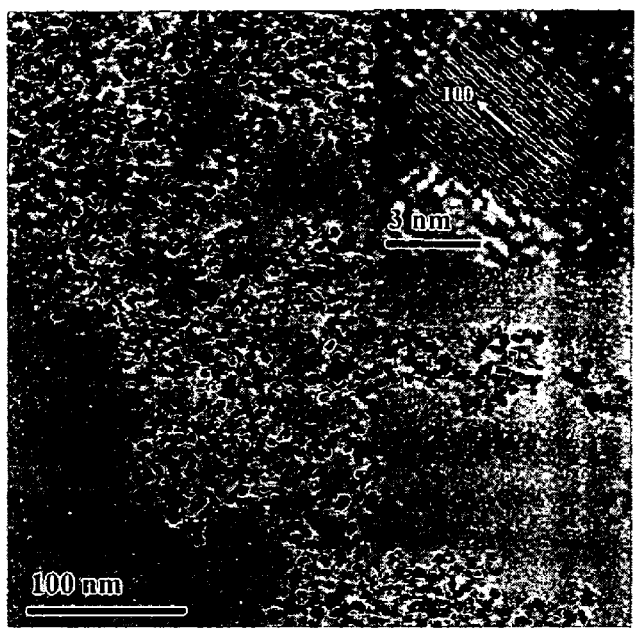
Fig. 3 is a TEM image of 3.5 nm sized spherical cerium oxide nanocrystals via a non-hydrolytic sol-gel reaction according to the present invention. Insets are their HRTEM images.

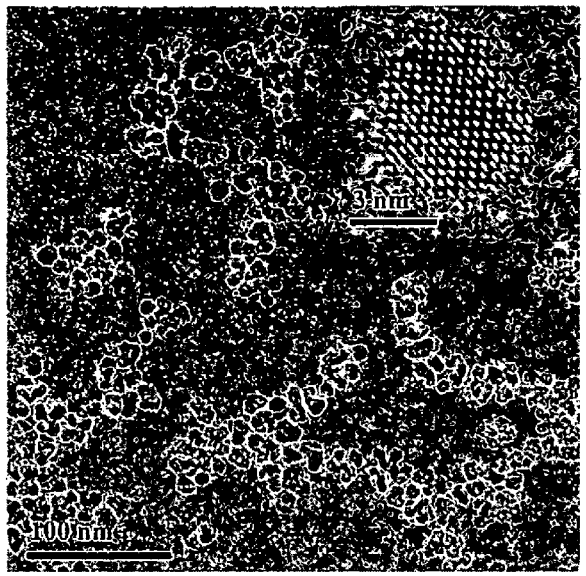
Fig. 4 is a TEM image of 5.2 nm sized spherical cerium oxide nanocrystals via a non-hydrolytic sol-gel reaction according to the present invention. Insets are their HRTEM images.

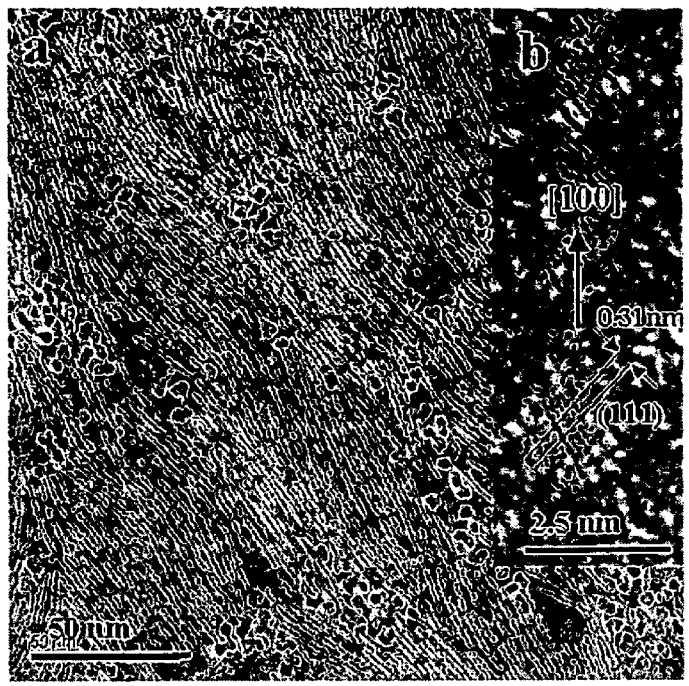
Fig. 5 is a TEM image of 1.2 × 80 nm wire shaped cerium oxide nanocrystals via a non-hydrolytic sol-gel reaction according to the present invention. Inset is its HRTEM image.

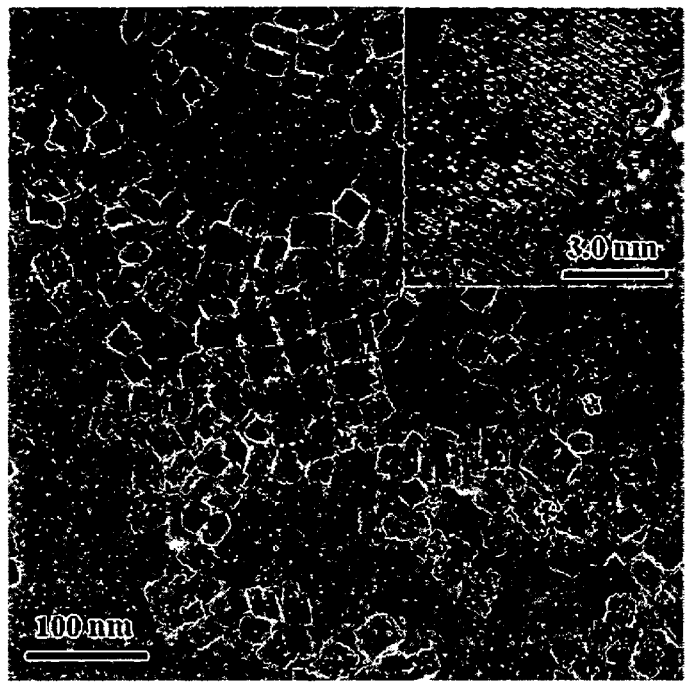
Fig. 6 is a TEM image of 30 nm cube shaped cerium oxide nanocrystals via a non-hydrolytic sol-gel reaction according to the present invention. Inset is its HRTEM image.

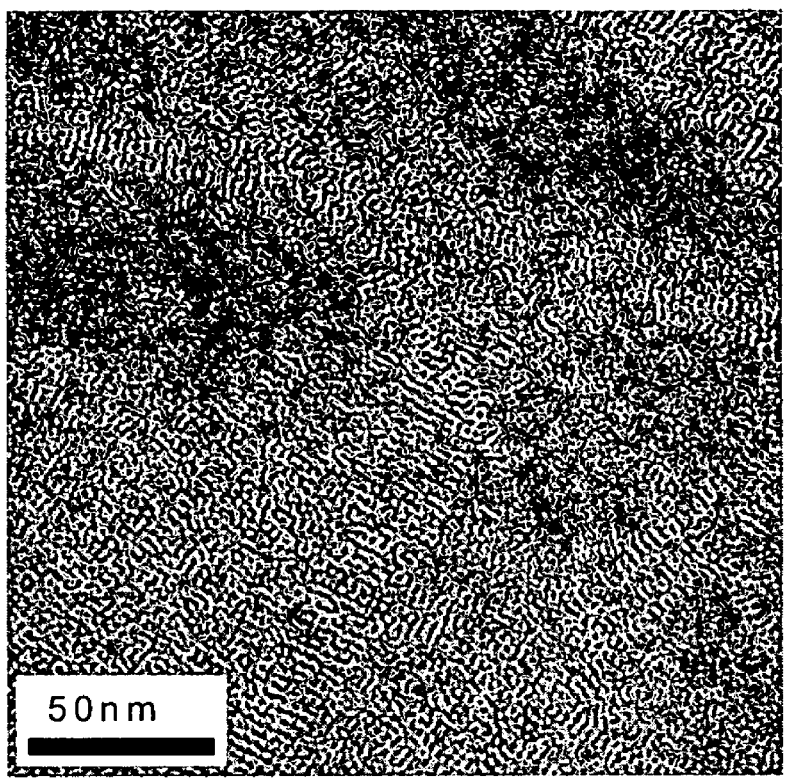
Fig. 7 is a TEM image of 2.2 nm sized spherical shaped cerium oxide nanocrystals.

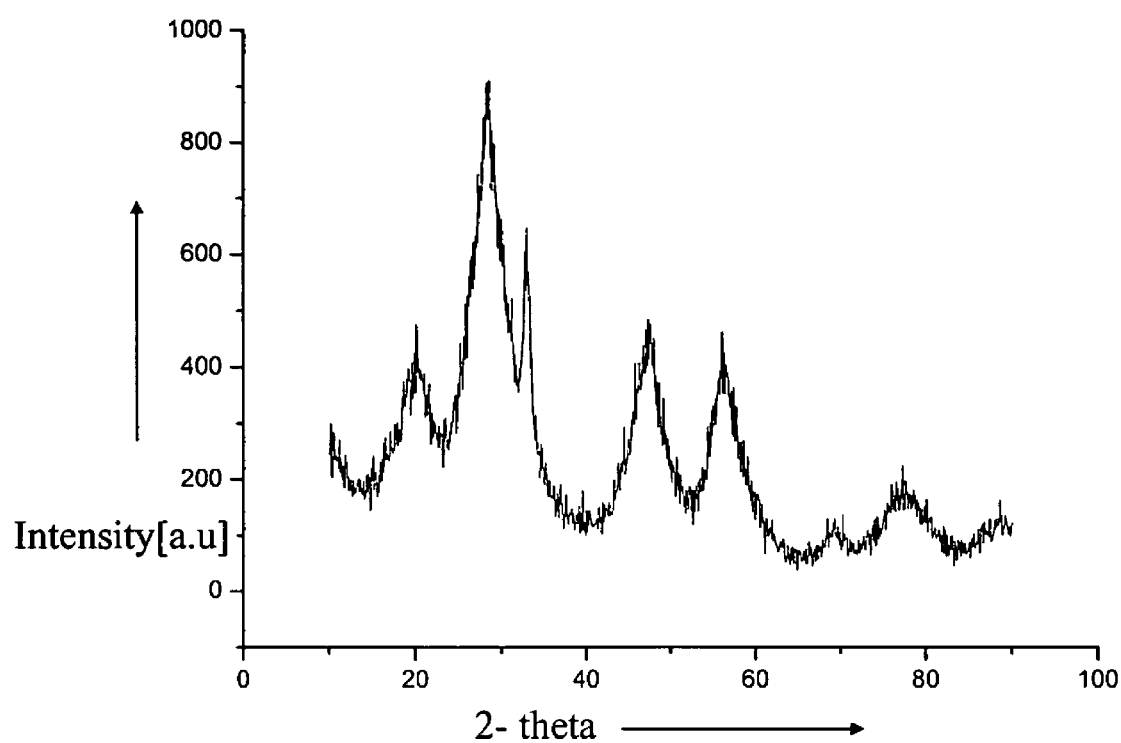
Fig. 8 is a XRD pattern of 2.2 nm sized spherical shaped cerium oxide nanocrystals.

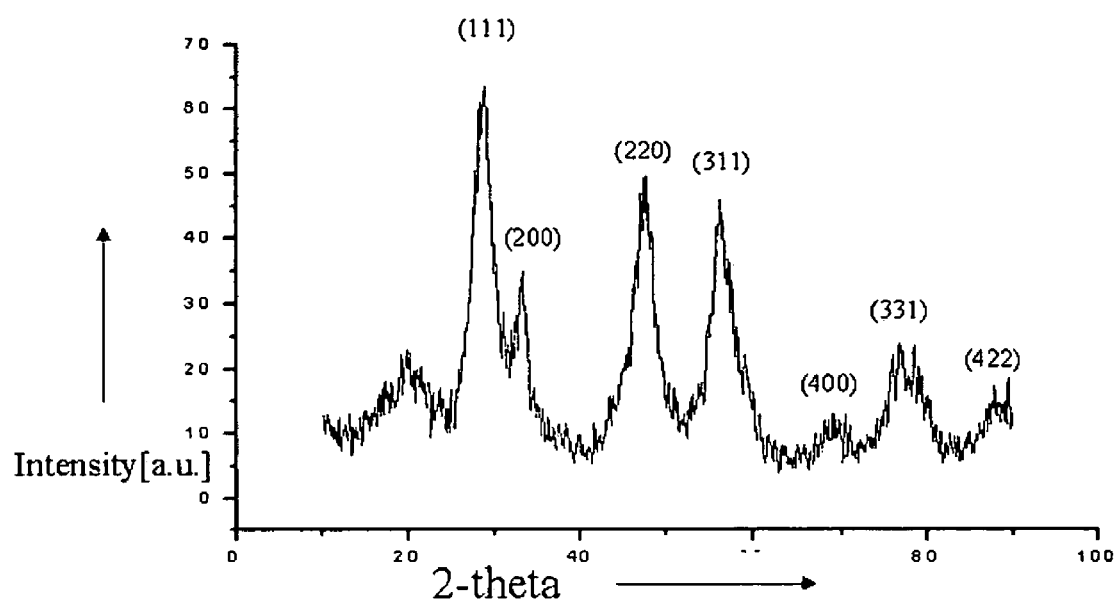
Fig. 9 is a XRD pattern of 1.2 × 80 nm wire shaped cerium oxide nanocrystals via a non-hydrolytic sol-gel reaction according to the present invention.

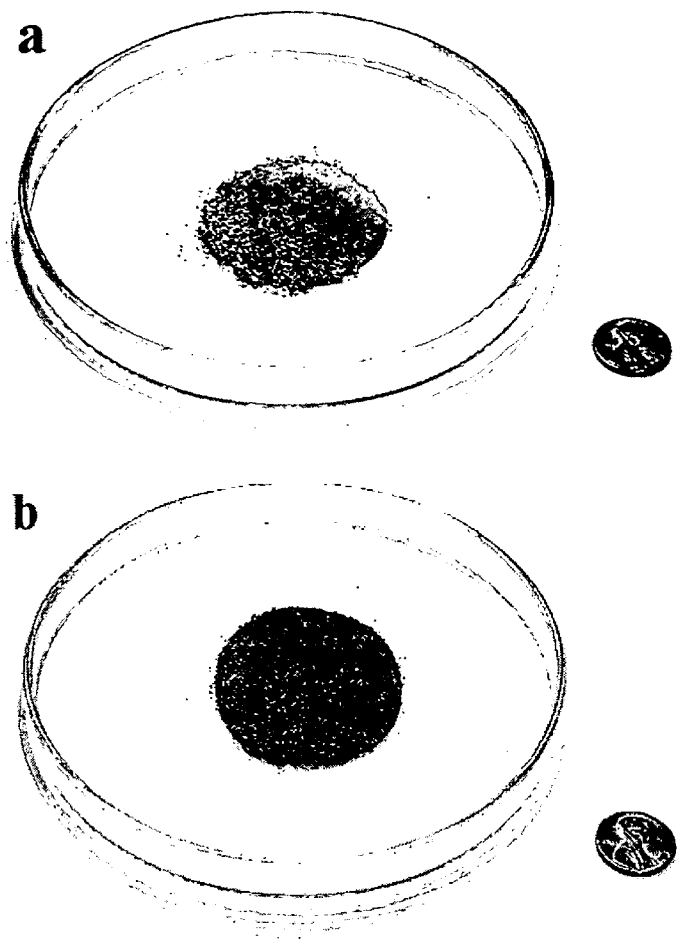
Fig. 10 is Photographs of (a) 3.5 nm-sized spherical shaped cerium oxide nanocrystals, and (b) wire shaped cerium oxide nanocrystals via a non-hydrolytic sol-gel reaction according to the present invention. The weight of both nanocrystals is about 10 grams.

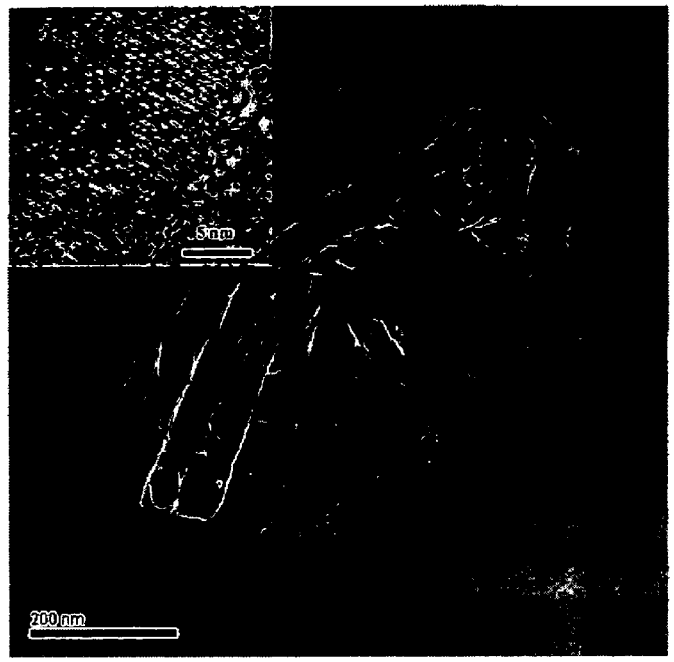
Fig. 11 is TEM images of 50 nm sized cube-shaped cerium oxide nanocrystals via a hydrolytic sol-gel reaction according to the present invention. Inset is its HRTEM image.

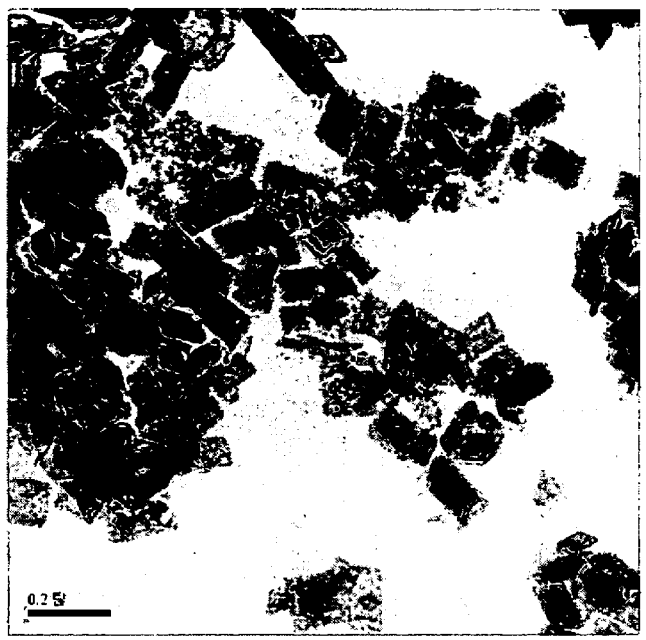
Fig. 12 is TEM images of 80 nm sized cube-shaped cerium oxide nanocrystals via a hydrolytic sol-gel reaction according to the present invention. Inset is its HRTEM image.

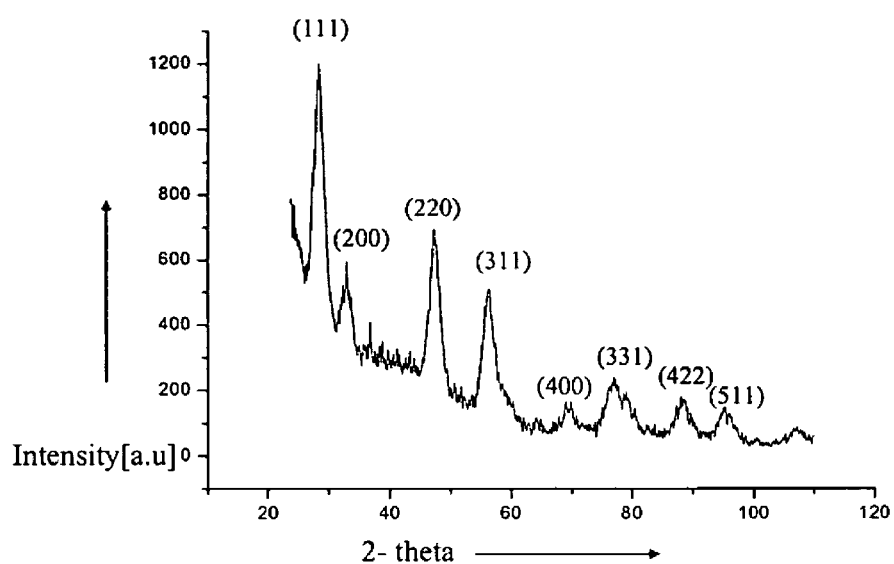
Fig. 13 is a XRD pattern of 50 nm sized cube-shaped cerium oxide nanocrystals via a hydrolytic sol-gel reaction according to the present invention.

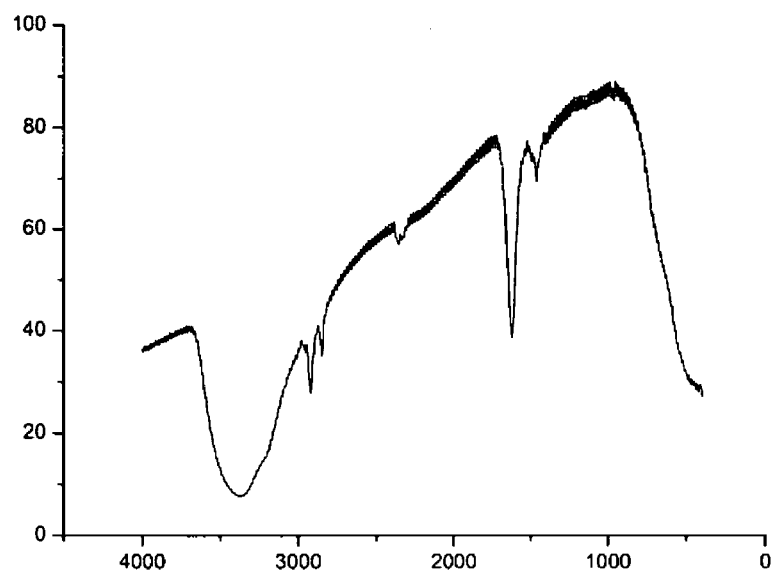
Fig. 14 is a Fourier transfer IR (FTIR) spectrum of dried cerium oxide nanocrystals via a hydrolytic sol-gel reaction according to the present invention.

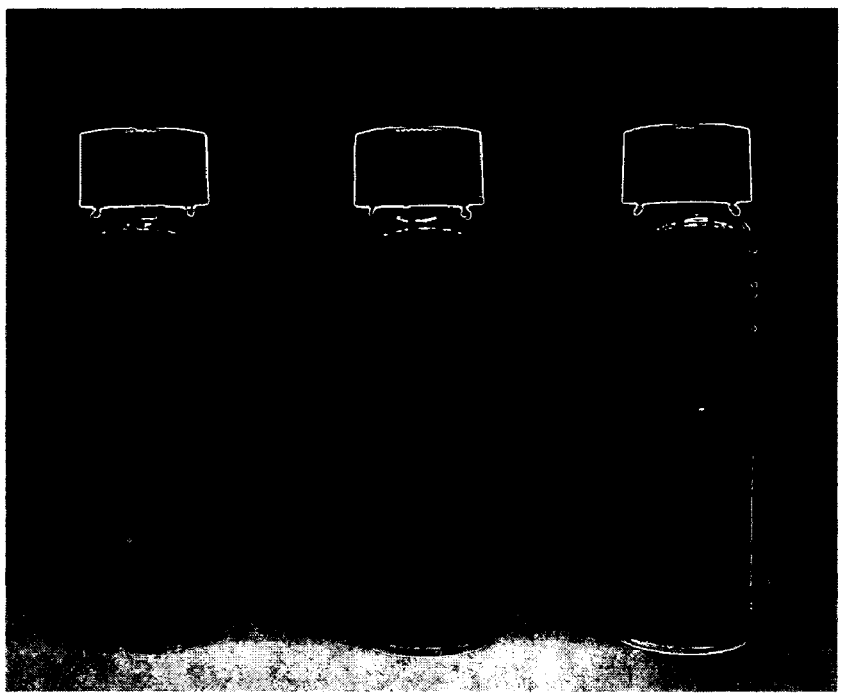
Fig. 15 is a Photograph of water solution with 3.5 nm, 40 nm, and 80 nm sized cerium oxide nanocrystals via a hydrolytic sol-gel reaction according to the present invention.

PROCESS FOR PRODUCING CERIUM OXIDE NANOCRYSTALS

TECHNICAL FIELD

The present invention relates to a new process for the production of cerium oxide ($CeO_2$) nanocrystals having various sizes and various shapes via hydrolytic sol-gel reactions or non-hydrolytic sol-gel reactions. More specifically, the present invention is directed to a process for the production of cerium oxide nanocrystals, which comprises the steps for: i) preparing a cerium-surfactant complex by reacting a cerium precursor and surfactant; and ii) aging said cerium-surfactant complex in an etheric compound at a temperature of 100° C. to 360° C.

BACKGROUND ART

The process of the present invention for the synthesis of cerium oxide nano-particles, may be classified into two (2) categories according to whether water is involved in the synthetic process or not. In the first category of the process of the present invention, cerium oxide nanocrystals are synthesized through a non-hydrolytic sol-gel reaction of a mixture which comprises an anhydrous cerium precursor, a surfactant and ether. In the second category of the process according to the present invention, cerium oxide nanocrystals are synthesized via a hydrolytic sol-gel reaction of a mixture which comprises a hydrous cerium precursor and a surfactant. The reaction mixture of the sol-gel reaction of the present invention may further comprise organic solvent.

The particle sizes and their size distribution, and shapes of cerium oxide nanocrystals synthesized according to the process of the present invention, may be controlled by varying cerium precursors, reaction times, reaction temperatures or surfactants.

For the last 20 years, nanocrystals have been intensively studied, not only for their fundamental scientific interest derived from their size-dependent properties, but also for their many technological applications. These nanocrystalline materials exhibit novel electronic, magnetic, optical, chemical and mechanical properties that cannot be achieved in their bulk counterparts.

Cerium oxide ($CeO_2$) is a rare earth oxide that has attracted a great deal of interest due to its unique properties, including its high mechanical strength, oxygen ion conductivity, and oxygen storage capacity. Because of these characteristics, cerium oxide has been extensively used as oxygen ion conductors in solid oxide fuel cells, oxygen pumps and amperometric oxygen monitors. Cerium oxide nanocrystals have been used as a polishing agent for the chemical mechanical planarization (CMP) process in semiconductor fabrication processes.

Up to now, several processes have been studied and developed to synthesize cerium oxide nanocrystals. These processes include coprecipitation method [Atul S. Deshpande, Nicola Pinna, Pablo Beato, Markus Antonietti, and Markurs Niederberger "Synthesis and Characterization of Stable and Crystalline $Ce_{1-x}Zr_xO_2$ Nanoparticle Sols" Chem. Mater. 2004, 16, 2599], solvothermal process [Masashi Inoue, Minoru Kimura, and Tomoyuki Inui "Transparent colloidal solution of 2 nm ceria particles" Chem. Commun. 1999, 957], reverse micelle method [Toshiyuki Masui, Kazuyasu Fujiwara, Ken-ichi Machida, and Gin-ya Adachi "Characterization of Cerium(IV) Oxide Ultrafine Particles Prepared Using Reversed Micelles" Chem. Mater. 1997, 9, 2197], and sonochemical method [Lunxiang Yin, Yanqin Wang, Guangsheng Pang, Yuri Koltypin, and Aharon Gedanken "Sonochemical Synthesis of Cerium Oxide Nanoparticles—Effect of Additives and Quantum Size Effect" J. Colloid Interface Sci. 2002, 246, 78].

Vioux and coworkers summarized many non-hydrolytic sol-gel reactions for the synthesis of oxide materials [Vioux, A "Nonhydrolytic Sol-Gel Routes to Oxides" Chem. Mater, 1997, Vol. 9, 2292].

Also, Joo et al. reported the synthesis of uniform-sized tetragonal zirconium oxide nanocrystals on the multi-gram scale via a non-hydrolytic sol-gel processes [Jin Joo, Taekyung Yu, Young Woon Kim, Hyun Min Park, Fanxin Wu, Jin Z. Zhang, and Taeghwan Hyeon, "Multi-gram Scale Synthesis and Characterization of Monodisperse Tetragonal Zirconia Nanocrystals," J. Am. Chem. Soc. 2003, 125, 6553]. In this paper, zirconia nanocrystals were produced using alkyl halide elimination non-hydrolytic sol-gel reaction in the presence of surfactant.

Very recently, cerium oxide nanocrystals having diameters of 30 nm~250 nm were synthesized via a thermal decomposition of cerium salts at a temperature of 400° C. to 1200° C. [WO2004/037722].

Unfortunately, the cerium oxide nanocrystals synthesized through the previous processes, have the following weak points for commercial applications.

Firstly, the cerium oxide nanocrystals larger than 80 nm synthesized through the conventional process, may increase the probability of the outbreak of scratch during the chemical mechanical planarization (CMP) processes.

Secondly, a time-consuming and laborious size selection process is required to obtain uniform cerium oxide nanocrystals since cerium oxide nanocrystals synthesized through the conventional process, are highly polydisperse.

Thirdly, the amount of the cerium oxide nanocrystals which can be obtained through the conventional process, is only a few milli-grams, which is not suitable amount for large-scale industrial applications.

Therefore, an object of the present invention is to provide a large-scale synthetic process to obtain cerium oxide nanocrystals having a narrow particle size distribution through an inexpensive process and by using non-toxic reagents in order to overcome the afore-mentioned deficiencies of the prior arts. That is, it is the primary object to provide a process for the preparation of cerium oxide nanocrystals via a non-hydrolytic sol-gel reaction, which comprises the steps for: i) the formation of a cerium-surfactant complex by heating the mixture of a cerium precursor and a surfactant under reduced pressure; and ii) aging of said cerium-surfactant complex in an etheric compound at a predetermined temperature.

A still another object of the present invention is to provide a process for the preparation of cerium oxide nanocrystals through a hydrolytic sol-gel reaction, which comprises the steps for: i) the formation of a cerium-surfactant complex by heating the mixture of a cerium precursor and a surfactant under atmospheric pressure; and ii) aging of said cerium-surfactant complex in an etheric compound at a predetermined temperature.

BRIEF DESCRIPTION OF THE DRAWINGS

FIG. 2 is a schematic flow chart showing a synthetic procedure of cerium oxide nanocrystals via a non-hydrolytic sol-gel reaction according to the present invention.

FIG. 3 is a TEM image of 3.5 nm sized spherical cerium oxide nanocrystals via a non-hydrolytic sol-gel reaction according to the present invention. Insets are their corresponding HRTEM images.

FIG. 4 is a TEM image of 5.2 nm sized spherical cerium oxide nanocrystals via a non-hydrolytic sol-gel reaction according to the present invention. Insets are their corresponding HRTEM images.

FIG. 5 is a TEM image of 1.2×80 nm wire shaped cerium oxide nanocrystals via a non-hydrolytic sol-gel reaction according to the present invention. Inset is its corresponding HRTEM image.

FIG. 6 is a TEM image of 30 nm cube shaped cerium oxide nanocrystals via a non-hydrolytic sol-gel reaction according to the present invention. Inset is its corresponding HRTEM image.

FIG. 7 is a TEM image of 2.2 nm sized spherical shaped cerium oxide nanocrystals.

FIG. 8 is a XRD pattern of 2.2 nm sized spherical shaped cerium oxide nanocrystals.

FIG. 9 is a XRD pattern of 1.2×80 nm wire shaped cerium oxide nanocrystals via a non-hydrolytic sol-gel reaction according to the present invention.

FIG. 10 is photographs of: (a) 3.5 nm-sized spherical shaped cerium oxide nanocrystals; and (b) wire shaped cerium oxide nanocrystals via a non-hydrolytic sol-gel reaction according to the present invention. The weight of both nanocrystals is about 10 grams.

FIG. 11 is a TEM image of 50 nm sized cube-shaped cerium oxide nanocrystals via a hydrolytic sol-gel reaction according to the present invention. Inset is its corresponding HRTEM image.

FIG. 12 is a TEM image of 80 nm sized cube-shaped cerium oxide nanocrystals via a hydrolytic sol-gel reaction according to the present invention. Inset is its corresponding HRTEM image.

FIG. 13 is a XRD pattern of 50 nm sized cube-shaped cerium oxide nanocrystals via a hydrolytic sol-gel reaction according to the present invention.

FIG. 14 is a Fourier transfer IR (FTIR) spectrum of dried cerium oxide nanocrystals via a hydrolytic sol-gel reaction according to the present invention.

FIG. 15 is a Photograph of water solution with 3.5 nm, 40 nm, and 80 nm sized cerium oxide nanocrystals via a hydrolytic sol-gel reaction according to the present invention.

DETAILED DESCRIPTION OF THE INVENTION

Figure 1:
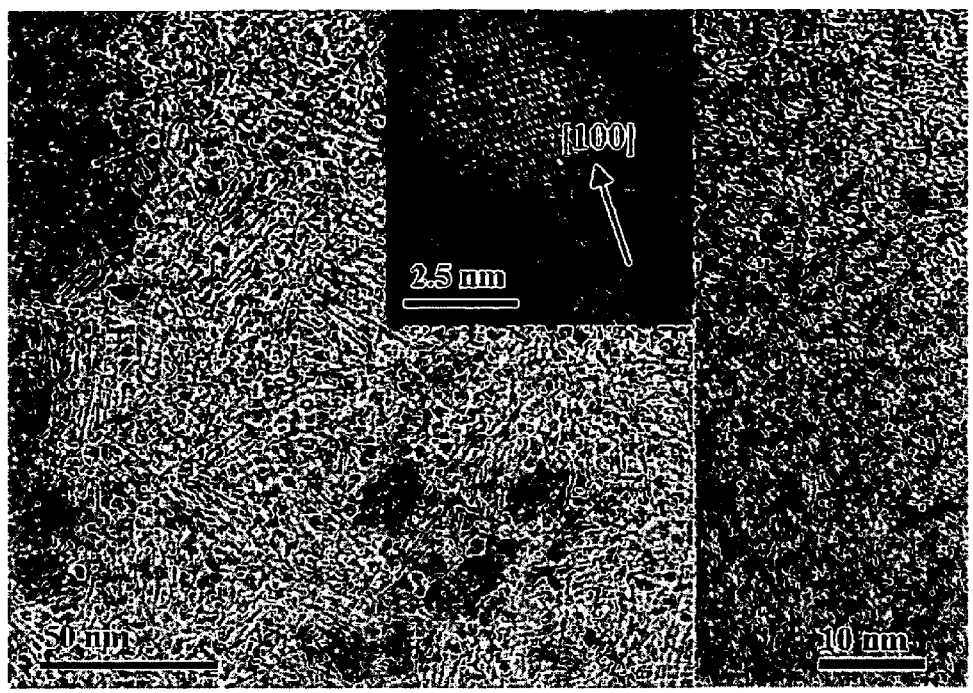
FIG. 1 is an exemplary transmission electron microscopic (TEM) image of tadpole-shaped nanowires consisted of 3.5 nm sized spherical head and wire-shaped tail with a diameter of 1.2 nm and length of 30 nm via a non-hydrolytic sol-gel reaction of the present invention.

The above primary object of the present invention may be achieved by providing a process for the preparation of cerium oxide nanocrystals via a non-hydrolytic sol-gel reaction, which comprises the steps for: i) the formation of a cerium-surfactant complex by heating the mixture of a cerium precursor and a surfactant under reduced pressure; and ii) aging of said cerium-surfactant complex in an etheric compound at a predetermined temperature.

The preparation process for the uniform-sized cerium oxide nanocrystals according to the present invention employs simple and cost-effective steps without going through any size selection process.

The mixture of a cerium precursor and a surfactant of step i) of the non-hydrolytic sol-gel reaction of the present invention, may further comprise organic solvents. That is, the non-hydrolytic sol-gel reaction according to the present invention may also comprises the steps for: i) forming a cerium-surfactant complex by heating a cerium precursor and a surfactant in an organic solvent under reduced pressure; and for ii) aging of said cerium-surfactant complex solution in an etheric compound at a temperature of 100° C. to 360° C.

The steps for the preparation cerium oxide nanocrystals through the non-hydrolytic sol-gel reaction of the present invention are described in reference to FIG. 2 in the following. FIG. 2 is a flowchart showing the process of synthesizing cerium oxide nanocrystals according to the present invention. The preparation of cerium oxide nanocrystals is completed by adding a poor solvent followed by centrifuging, and retrieving said cerium oxide nanocrystals.

Preferably, the cerium precursor used in the non-hydrolytic sol-gel reaction of the present invention for synthesizing cerium oxide nanocrystals, may be selected from the group consisting of cerium(III) acetate hydrate, cerium(III) acetylacetonate hydrate, cerium(III) bromide, cerium(III) carbonate hydrate, cerium(III) chloride, cerium(III) chloride heptahydrate, cerium(III) 2-ethylhexanoate, cerium(III) fluoride, cerium(IV) fluoride, cerium(IV) hydroxide, cerium(III) iodide, cerium(III) nitrate hexahydrate, cerium(III) oxalate hydrate, cerium(III) sulfate, cerium(III) sulfate hydrate or cerium(IV) sulfate, etc.

Preferably, the surfactant employed in the non-hydrolytic sol-gel reaction of the present invention for stabilizing the cerium oxide nanocrystals, may be selected from the group consisting of neutral surfactants such as, for example, oleic acid, octanoic acid, decanoic acid, stearic acid and trioctylphosphine oxide (TOPO), triphenylphosphine (TPP), and trioctylphosphine (TOP), and alkyl amines ($RNH_2$) where R is alkyl groups with 3-18 carbons, such as, for example, oleylamine, octylamine, hexadecylamine, trialkylamine and the mixtures thereof.

The organic solvent can be used in the non-hydrolytic sol-gel reaction of the present invention may be selected from the group consisting of heterocyclic compounds such as, for example, pyridine and tetrahydrofurane (THF), and aromatic compounds such as, for example, toluene, xylene, mesitylene, benzene, and dimethyl sulfoxide (DMSO), and dimethylformamide (DMF), and alcohols such as, for example, octyl alcohol, and decanol, and hydrocarbons such as, for example, heptane, octane, decane, dodecane, tetradecane, and hexadecane. The solvents may be employed in the present invention should have high enough boiling temperature since the metal-surfactant precursors must be decomposed and be reacted with an etheric compound to produce cerium oxide nanocrystals.

The reaction temperature of step i) of the non-hydrolytic sol-gel reaction of the present invention, in reference to FIG. 2, in Step A 101 for the formation of the cerium-surfactant complex ranges preferably from 20° C. to 200° C.

The etheric compound may be employed for step ii) of the non-hydrolytic sol-gel reaction of the present invention, in reference to FIG. 2, in Step B 103, may be selected from ethers with 3-18 carbons such as, for example, octyl ether, butyl ether, hexyl ether, phenyl ether, decyl ether, and etc.

The temperature for addition of the etheric compound to cerium-surfactant complex in step ii) of the non-hydrolytic sol-gel reaction of the present invention, may range preferably from 20° C. to 100° C.

The preferable aging temperature of step ii) of the non-hydrolytic sol-gel reaction of the present invention, ranges from 100° C. to 360° C. And the preferable aging time of step ii) of the non-hydrolytic sol-gel reaction in the present invention, ranges from 10 seconds to 48 hours.

The cerium oxide nanocrystals prepared according to the non-hydrolytic sol-gel reaction of the present invention, are separated and retrieved by adding a poor solvent, followed by centrifugation, wherein said poor solvent is a solvent that can not disperse nanocrystals effectively and induce the precipitation of the nanocrystals.

According to the non-hydrolytic sol-gel reaction of the present invention, in reference to FIG. 1, 3, 4, 5, 6, 7, TEM images of obtained cerium oxide nanocrystals show spherical nanocrystals with diameters of 2.2 nm, 3.5 nm and 5.2 nm, nanowires with length of 90 nm and diameter of 1.2 nm, tadpole shaped nanocrystals with head diameter of 3.5 nm and length of 40 nm and cube-shaped nanocrystals with edge length of 30 nm size.

According to the non-hydrolytic sol-gel reaction of the present invention, in reference to FIG. 8, 9, the powder X-ray diffraction (XRD) patterns of the nanocrystals revealed that said cerium oxide nanocrystals possessed a cubic fluorite structure.

In reference to FIG. 10, under optimized synthetic conditions, the present inventors were able to synthesize said spherical cerium oxide nanocrystals in 10 gram scale in a single reaction using 200 mL of said solvent.

Meanwhile, the above another object of the present invention may be achieved by providing a new hydrolytic sol-gel synthetic reactions for the synthesis of uniform-sized cerium oxide nanocrystals having various sizes and shapes in a large quantity.

The process for the preparation of uniform-sized cerium oxide nanocrystals through the hydrolytic sol-gel reaction of the present invention is a very simple and inexpensive method without going through any size selection process. The hydrolytic sol-gel reaction of the present invention comprises the steps for: i) forming a cerium-surfactant complex by heating a cerium precursor and a surfactant under air atmosphere; and for ii) aging of said cerium-surfactant complex solution at a temperature of 100° C. to 360° C.

The mixture of a cerium precursor and a surfactant of step i) of the hydrolytic sol-gel reaction of the present invention may also further comprise organic solvents. That is, the hydrolytic sol-gel reaction according to the present invention may comprise the steps for: i) forming a cerium-surfactant complex by heating a cerium precursor and a surfactant in an organic solvent under atmospheric pressure; and for ii) aging of cerium-surfactant complex solution in an etheric compound at a temperature of 100° C. to 360° C.

Preferably, the cerium precursor used in the hydrolytic sol-gel reaction of the present invention for synthesizing cerium oxide nanocrystals, may be selected from the group consisting of cerium(III) acetate hydrate, cerium(III) acetylacetonate hydrate, cerium(III) bromide, cerium(III) carbonate hydrate, cerium(III) chloride, cerium(III) chloride heptahydrate, cerium(III) 2-ethylhexanoate, cerium(III) fluoride, cerium(IV) fluoride, cerium(IV) hydroxide, cerium(III) iodide, cerium(III) nitrate hexahydrate, cerium(III) oxalate hydrate, cerium(III) sulfate, cerium(III) sulfate hydrate or cerium(IV) sulfate, etc.

Preferably, the surfactant employed in the hydrolytic sol-gel reaction of the present invention for stabilizing the cerium oxide nanocrystals, may be selected from the group consisting of neutral surfactants such as, for example, oleic acid, octanoic acid, decanoic acid, stearic acid and trioctylphosphine oxide (TOPO), triphenylphosphine (TPP), and trioctylphosphine (TOP), and alkyl amines ($RNH_2$) where R is alkyl groups with 3-18 carbons, such as, for example, oleylamine, octylamine, hexadecylamine, trialkylamine, or the mixtures thereof.

The organic solvent can be used in the hydrolytic sol-gel reaction of the present invention may be selected from the group consisting of heterocyclic compounds such as, for example, pyridine and tetrahydrofurane (THF), and aromatic compounds such as, for example, toluene, xylene, mesitylene, benzene, and dimethyl sulfoxide (DMSO), and dimethylformamide(DMF), and alcohols such as, for example, octyl alcohol, and decanol, and hydrocarbons such as, for example, heptane, octane, decane, dodecane, tetradecane, hexadecane, and etc. The solvents may be employed in the present invention should have high enough boiling temperature since the metal-surfactant precursors must be decomposed and be reacted with an etheric compound to produce cerium oxide nanocrystals.

The reaction temperature of step i) of the hydrolytic sol-gel reaction of the present invention, for the formation of the cerium-surfactant complex ranges preferably from 20° C. to 200° C.

The etheric compound may be employed for step ii) of the hydrolytic sol-gel reaction of the present invention, may be selected from ethers with 3-18 carbons such as, for example, octyl ether, butyl ether, hexyl ether, phenyl ether, decyl ether, and etc.

The temperature for addition of the etheric compound to cerium-surfactant complex in step ii) of the hydrolytic sol-gel reaction of the present invention may range preferably from 20° C. to 100° C.

The preferable aging temperature of step ii) of the hydrolytic sol-gel reaction of the present invention ranges from 100° C. to 360° C. The preferable aging time of step ii) of the hydrolytic sol-gel reaction in the present invention ranges from 10 seconds to 48 hours.

The cerium oxide nanocrystals prepared according to the hydrolytic sol-gel reaction of the present invention can also be separated and retrieved by adding a poor solvent, followed by centrifugation, wherein said poor solvent is a solvent that can not disperse nanocrystals effectively and induce the precipitation of the nanocrystals.

According to the hydrolytic sol-gel reaction of the present invention for synthesizing cerium oxide nanocrystals, in reference to FIGS. 11 and 12, TEM images of obtained cerium oxide nanocrystals show cube-shaped nanocrystals with edge length of 50 nm and 80 nm.

In reference to FIG. 13, the powder X-ray diffraction (XRD) pattern revealed that the cerium oxide nanocrystals prepared through the hydrolytic sol-gel reaction of the present invention, possessed a cubic fluorite structure.

BEST MODES FOR CARRYING OUT THE INVENTION

Example 1

Synthesis of 3.5 nm Sized Spherical Cerium Oxide Nanocrystals Via a Non-Hydrolytic Sol-Gel Reaction 1.7 G of cerium (III) nitrate hexahydrate (4 mmol) was added to 20 mL of oleylamine (technical grade, 60 mmol, 16.26 g) at room temperature. The resulting solution was heated to 90° C. under a vacuum, forming a homogeneous and clear black colored solution.

2 mL of phenyl ether (12 mmol, 2.1 g) was injected into the solution at 90° C., and the solution temperature was observed to increase to 120° C., demonstrating that the reaction between cerium nitrate and phenyl ether did occur. The resulting mixture was heated to 320° C. and aged at that temperature for 2 hours, resulting in a black colloidal solution. 100

ML of ethanol was added to cause the precipitation of the cerium oxide ($CeO_2$) nanocrystals. The precipitate was retrieved by centrifugation, producing white brown colored $CeO_2$ nanocrystals. The resulting nanocrystals were dispersible in many organic solvents, such as toluene, hexane and octane.

Example 2

Synthesis of 5.2 nm Sized Spherical Cerium Oxide Nanocrystals Via a Non-Hydrolytic Sol-Gel Reaction 1.7 G of cerium (III) nitrate hexahydrate (4 mmol) was added to a mixture composed of 12 mmol of olyelamine (technical grade, 3.21 g) and 20 mL of tri-n-octylamine (45 mmol, 16.18 g) complex at room temperature.

The resulting solution was heated to 90° C. under a vacuum, forming a homogeneous and clear black colored solution. 2 ML of phenyl ether (12 mmol, 2.1 g) was injected into the solution at 90° C., and the solution temperature was observed to increase to 120° C., demonstrating that the reaction between cerium nitrate and phenyl ether did occur.

The resulting mixture was heated to 320° C. and aged at that temperature for 2 hours, resulting in a black colloidal solution. 100 ML of ethanol was added to cause the precipitation of the cerium oxide ($CeO_2$) nanocrystals. The precipitate was retrieved by centrifugation, producing white brown colored $CeO_2$ nanocrystals. The resulting nanocrystals were dispersible in many organic solvents, such as toluene, hexane and octane.

Example 3

Synthesis of Cerium Oxide Nanowires Via a Non-Hydrolytic Sol-Gel Reaction

The wire-shaped cerium oxide nanocrystals were synthesized as follows. Cerium (III) nitrate hexahydrate (4 mmol, 1.7 g) was added to a mixed solvent composed of 20 mL of oleylamine (technical grade, 60 mmol, 16.26 g) and 3.39 g of oleic acid (12 mmol) at 90° C.

The resulting solution was heated to 90° C. under a vacuum, forming a homogeneous and clear black colored solution. 2 ML of phenyl ether (12 mmol, 2.1 g) was injected into the solution at 90° C., and the solution temperature was observed to increase to 120° C., demonstrating that the reaction between cerium nitrate and phenyl ether did occur.

The resulting mixture was heated to 320° C. and aged at that temperature for 2 hours, resulting in a black colloidal solution. 100 ML of ethanol was added to cause the precipitation of the cerium oxide ($CeO_2$) nanocrystals. The precipitate was retrieved by centrifugation, producing white brown colored $CeO_2$ nanocrystals. The resulting nanocrystals were dispersible in many organic solvents, such as toluene, hexane and octane.

When different amounts of oleic acid, 6 mmol (1.7 g), 12 mmol (3.39 g), 18 mmol (5.08 g), and 24 mmol (6.78 g), were used in the synthesis, cerium-oxide nanowires with a uniform diameter of 1.2 nm, and average lengths of 27.8 nm, 71.1 nm, 115.5 nm, 164.5 nm, were produced, respectively.

Example 4

Synthesis of Tadpole-Shaped Cerium Oxide Nanowires Via a Non-Hydrolytic Sol-Gel Reaction The wire-shaped cerium oxide nanocrystals were synthesized as follows. Cerium (III) nitrate hexahydrate (2 mmol, 0.85 g) was added to a mixed solvent composed of 20 mL of oleylamine (technical grade, 60 mmol, 16.26 g) and 1.69 g of oleic acid (6 mmol) at 90° C.

The resulting solution was heated to 90° C. under a vacuum, forming a homogeneous and clear black colored solution. 1 ML of phenyl ether (6 mmol, 1.05 g) was injected into the solution at 90° C., and the solution temperature was observed to increase to 120° C., demonstrating that the reaction between cerium nitrate and phenyl ether did occur.

The resulting mixture was heated to 320° C. and aged at that temperature for 1 hours, resulting in a black colloidal solution. 100 ML of ethanol was added to cause the precipitation of the cerium oxide ($CeO_2$) nanocrystals. The precipitate was retrieved by centrifugation, producing white brown colored $CeO_2$ nanocrystals. The resulting nanocrystals were dispersible in many organic solvents, such as toluene, hexane and octane.

Example 5

Synthesis of Cube-Shaped Cerium Oxide Nanocrystals Via a Non-Hydrolytic Sol-Gel Reaction 1.6 G of cerium (III) chloride heptahydrate (4 mmol) was added to 20 mL of oleylamine (technical grade, 60 mmol, 16.26 g). The resulting solution was heated to 90° C. under a vacuum, forming a homogeneous and clear black colored solution. 2 ML of phenyl ether (12 mmol, 2.1 g) was injected into the solution at 90° C., and the solution temperature was observed to increase to 120° C., demonstrating that the reaction between cerium nitrate and phenyl ether did indeed occur.

The resulting mixture was heated to 320° C. and aged at that temperature for 2 hours, resulting in a black colloidal solution. 100 ML of ethanol was added to cause the precipitation of the $CeO_2$ nanocrystals. The precipitate was retrieved by centrifugation, producing white brown colored $CeO_2$ nanocrystals. The resulting nanocrystals were dispersible in many organic solvents, such as toluene, hexane and octane.

Example 6

Synthesis of Cube-Shaped Cerium Oxide Nanocrystals Via a Hydrolytic Sol-Gel Reaction 1.56 G of cerium (III) chloride heptahydrate (4 mmol) was added to 20 mL of oleylamine (technical grade, 60 mmol, 16.26 g). The resulting solution was heated to 90° C., forming a homogeneous and clear dark brown colored solution. The mixture was heated to 265° C. and aged at that temperature for 2 hours, resulting in a black colloidal solution. 100 ML of ethanol was added to cause the precipitation of the $CeO_2$ nanocrystals. The precipitate was retrieved by centrifugation, producing white purple colored $CeO_2$ nanocrystals.

This ethanol washing procedure was repeated three times and the resulting nanocrystals were dispersible in water. To obtain large amount of cerium oxide nanocrystals, such 10 grams of cerium oxide nanocrystals, we used 10 times larger amount of all reagents.

Example 7

Sampling Experiments at Various Aging Temperatures for Observing the Growth of Spherical Cerium Nanocrystals Via a Non-Hydrolytic Sol-Gel Reaction 1.7 G of cerium (III) nitrate hexahydrate (4 mmol) was added to 20 mL of oleylamine (technical grade, 60 mmol, 16.26 g) or a mixture composed of 12 mmol of olyelamine (technical grade, 3.21 g) and 20 mL tri-n-octylamine (45 mmol, 16.18 g) complex at room temperature.

The resulting solution was heated to 90° C. under a vacuum, forming a homogeneous and clear black colored solution. 2 ML of phenyl ether (12 mmol, 2.1 g) was injected into the solution at 90° C., and the solution temperature was observed to increase to 120° C., demonstrating that the reaction between cerium nitrate and phenyl ether did occur.

The aging temperature was increased from 120° C. up to 320° C. with a heating rate of 2° C./min and sampling experiments were performed every 20° C. 100 ML of ethanol was added to the retrieved samples, causing a precipitation of cerium oxide ($CeO_2$) nanocrystals. The precipitate was retrieved by centrifugation, producing white brown colored $CeO_2$ nanocrystals.

Example 8

Sampling Experiments at Various Aging Times for Observing the Growth of Spherical Cerium Nanocrystals Via a Non-Hydrolytic Sol-Gel Reaction 1.7 G of cerium (III) nitrate hexahydrate (4 mmol) was added to 20 mL of oleylamine (technical grade, 60 mmol, 16.26 g) or a mixture composed of 12 mmol of olyelamine (technical grade, 3.21 g) and 20 mL tri-n-octylamine (45 mmol, 16.18 g) complex at room temperature.

The resulting solution was heated to 90° C. under a vacuum, forming a homogeneous and clear black colored solution. 2 ML of phenyl ether (12 mmol, 2.1 g) was injected into the solution at 90° C., and the solution temperature was observed to increase to 120° C., demonstrating that the reaction between cerium nitrate and phenyl ether did indeed occur.

After the temperature was reached at 320° C., sampling experiments were performed at the aging times of 1 min, 10 min, 30 min, 2 hour, 4 hour, 6 hour, 12 hour, 24 hour, and 40 hour. 100 ML of ethanol was added to the retrieved samples, causing a precipitation of cerium oxide ($CeO_2$) nanocrystals.

The precipitate was retrieved by centrifugation, producing white brown colored $CeO_2$ nanocrystals.

Example 9

Sampling Experiments at Various Aging Temperatures for Observing the Growth of Spherical Cerium Nanocrystals Via a Hydrolytic Sol-Gel Reaction 1.56 G of cerium (III) chloride heptahydrate (4 mmol) was added to 20 mL of oleylamine (technical grade, 60 mmol, 16.26 g). The resulting solution was heated to 90° C., forming a homogeneous and clear dark brown colored solution.

The mixture was heated to 360° C. and aged at that temperature for 2 hours, resulting in a black colloidal solution. The aging temperature was increased from 120° C. up to 360° C. with a heating rate of 2° C./min and sampling experiments were performed every 20° C. 100 ML of ethanol was added to the retrieved samples, causing a precipitation of cerium oxide ($CeO_2$) nanocrystals.

The precipitate was retrieved by centrifugation, producing white brown colored $CeO_2$ nanocrystals.

Example 10

Sampling Experiments at Various Aging Times for Observing the Growth of Spherical Cerium Nanocrystals Via a Hydrolytic Sol-Gel Reaction 1.56 G of cerium (III) chloride heptahydrate (4 mmol) was added to 20 mL of oleylamine (technical grade, 60 mmol, 16.26 g). The resulting solution was heated to 90° C., forming a homogeneous and clear dark brown colored solution. After temperature was reached at 265° C., sampling experiments were performed at the aging time of 1 min, 10 min, 30 min, 2 hour, 4 hour, 6 hour, 12 hour, 24 hour, 40 hour. 100 ML of ethanol was added to the retrieved samples, causing a precipitation of cerium oxide ($CeO_2$) nanocrystals.

The precipitate was retrieved by centrifugation, producing white brown colored $CeO_2$ nanocrystals.

Example 11

Synthesis of Quasi-Spherical Cerium Oxide Nanocrystals Via a Non-Hydrolytic Sol-Gel Reaction Using Various Cerium Precursors 4 Mmol of cerium(III) sulfate, cerium(III) acetylacetonate hydrate, cerium(III) acetate hydrate or cerium(III) fluorite was added to 20 mL of oleylamine (technical grade, 60 mmol, 16.26 g) or a mixture composed of 12 mmol of olyelamine (technical grade, 3.21 g) and 20 mL tri-n-octylamine (45 mmol, 16.18 g) complex at room temperature.

The resulting solution was heated to 90° C. under a vacuum, forming a homogeneous and white purple colored solution. 2 ML of phenyl ether (12 mmol, 2.1 g) was injected into the solution at 90° C., and the solution temperature was observed to increase to 120° C., demonstrating that the reaction between cerium precursor and phenyl ether did occur. The resulting mixture was heated to 320° C. and aged at that temperature for 2 hours, resulting in a light brown solution.

Example 12

Synthesis of Very Small Sized (<2 nm) Cerium Oxide Nanocrystals 1.7 G of cerium (III) nitrate hexahydrate (4 mmol) was added to 20 mL of oleylamine (technical grade, 60 mmol, 16.26 g) or a mixture composed of oleylamine/oleic acid complex (20 ml/3.3 g) at room temperature.

The resulting solution was heated to 90° C. under a vacuum, forming a homogeneous and clear black colored solution. The resulting mixture was heated to 130° C. and aged at that temperature for 2 hours, resulting in a black colloidal solution. 100 ML of ethanol was added to cause the precipitation of the $CeO_2$ nanocrystals. The precipitate was retrieved by centrifugation, producing white brown colored $CeO_2$ nanocrystals.

The resulting nanocrystals were dispersible in many organic solvents, such as toluene, hexane and octane.

Example 13

Synthesis of Very Small Sized (<2 nm) Cerium Oxide Nanocrystals Using Various Solvent/Surfactant Systems 1.7 G of cerium (III) nitrate hexahydrate (4 mmol) was added to a mixture composed of oleylamine/octanoic acid complex (20 ml/1.8 g), oleylamine/decanoic acid complex (20 ml/2.3 g), tri-n-octylamine/octanoic acid complex (20 ml/1.8 g) or tri-n-octylamine/octanoic acid complex (20 ml/2.3 g) at room temperature.

The resulting solution was heated to 90° C. under a vacuum, forming a homogeneous and clear black colored solution. The resulting mixture was heated to 130° C. and aged at that temperature for 2 hours, resulting in a black colloidal solution. 100 ML of ethanol was added to cause the precipitation of the $CeO_2$ nanocrystals. The precipitate was retrieved by centrifugation, producing white brown colored $CeO_2$ nanocrystals. The resulting nanocrystals were dispersible in many organic solvents, such as toluene, hexane and octane.

INDUSTRIAL APPLICABILITY

According to the present invention, uniform-sized cerium oxide nanocrystals with quasi-spherical, wire, tadpole and cube shapes can be prepared through non-hydrolytic sol-gel reaction or hydrolytic sol-gel reaction.

The process of the present invention allows uniform-sized nanocrystals to be obtained on a large scale of tens of grams in a single reaction without the need for a further size sorting process. When the reactors are set-up in commercial scale, large amount of mono dispersed nanocrystals can be readily obtained through the simple and cost-effective process of the present invention.

In addition, cerium oxide nanocrystals with various shapes such as wires, tad-pole shapes, and spheres can also be produced, simply by changing the reaction conditions.

What is claimed is:

1. A process for preparing cerium oxide nanocrystals via a non-hydrolytic sol-gel reaction, which comprises: i) forming a cerium-surfactant complex by heating a mixture of a cerium precursor and a surfactant under reduced pressure; and ii) aging said cerium-surfactant complex in an etheric compound at a predetermined temperature.

2. The process according to claim 1, wherein said mixture of cerium precursor and surfactant of step i) further comprises one or more organic solvent.

3. The process according to claim 1, wherein said cerium precursor is selected from the group consisting of cerium(III) acetate hydrate, cerium(III) acetylacetonate hydrate, cerium (III) bromide, cerium(III) carbonate hydrate, cerium(III) chloride, cerium(III) chloride heptahydrate, cerium(III) 2-ethylhexanoate, cerium(III) fluoride, cerium(IV) fluoride, cerium(IV) hydroxide, cerium(III) iodide, cerium(III) nitrate hexahydrate, cerium(III) oxalate hydrate, cerium(III) sulfate, cerium(III) sulfate hydrate and cerium(IV) sulfate.

4. The process according to claim 1, wherein said surfactant of step i) is selected from the group consisting of oleic acid, octanoic acid, decanoic acid, stearic acid, trioctylphosphine oxide (TOPO), triphenylphosphine (TPP), trioctylphosphine (TOP), and an alkyl amine ($RNH_2$) wherein R is an alkyl group of 3 to 18 carbons, and mixtures thereof.

5. The process according to claim 2, wherein said solvent is selected from the group consisting of pyridine, tetrahydrofurane (THF), toluene, xylene, mesitylene, benzene, dimethyl sulfoxide (DMSO), dimethylformamide (DMF), alcoholic compounds, hydrocarbons and mixtures thereof.

6. The process according to claim 1, wherein a temperature of step i) for formation of said cerium-surfactant complex ranges from 100° C. to 200° C.

7. The process according to claim 1, wherein said temperature for aging of said cerium-surfactant complex in said etheric compound ranges from 100° C. to 360° C.

8. The process according to claim 1, wherein time for aging said cerium-surfactant complex at the predetermined temperature ranges from 10 seconds to 48 hours.

9. The process according to claim 1, wherein said cerium oxide nanocrystals are separated and retrieved by adding a poor solvent, followed by centrifugation.

10. The process according to claim 1, wherein time for aging said cerium-surfactant complex at the predetermined temperature ranges from 10 seconds to 48 hours.

11. The process according to claim 1, wherein said cerium oxide nanocrystals are separated and retrieved by adding a poor solvent, followed by centrifugation.

12. The process according to claim 4, wherein the alkyl amine is selected from the group consisting of oleylamine, octylamine, hexadecylamine, trialkylamine and mixtures thereof.

13. The process according to claim 5, wherein the alcoholic compounds are selected from the group consisting of octyl alcohol, decanol and mixtures thereof.

14. The process according to claim 5, wherein the hydrocarbons are selected from the group consisting of heptane, octane, decane, dodecane, tetradecane, hexadecane and mixtures thereof.

15. The process according to claim 1, wherein the etheric compound is selected from the group consisting of octyl ether, butyl ether, hexyl ether, phenyl ether, decyl ether, and mixtures thereof.

16. The process according to claim 1, wherein a temperature in said step i) forming the cerium-surfactant complex by heating a mixture of a cerium precursor and a surfactant under reduced pressure ranges from 20° C. to 200° C.

17. The process according to claim 1, wherein the etheric compound is added to the cerium-surfactant complex at temperature of 20° C. to 100° C. in step ii).

* * * * *